(12) United States Patent
Pfaendner et al.

(10) Patent No.: US 8,686,073 B2
(45) Date of Patent: Apr. 1, 2014

(54) LAYERED SILICATE FLAME RETARDANT COMPOSITIONS

(71) Applicant: BASF SE, Ludwigshafen (DE)

(72) Inventors: Rudolf Pfaendner, Rimbach (DE); Constantine D. Papaspyrides, Athens (GR); Pantelis K. Kiliaris, Halkis (GR)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/775,667

(22) Filed: Feb. 25, 2013

(65) Prior Publication Data

US 2013/0165558 A1 Jun. 27, 2013

Related U.S. Application Data

(63) Continuation of application No. 13/139,312, filed as application No. PCT/EP2009/066715 on Dec. 9, 2009, now abandoned.

(30) Foreign Application Priority Data

Dec. 17, 2008 (EP) ..................................... 08171905

(51) Int. Cl.
| | |
|---|---|
| *C08K 5/00* | (2006.01) |
| *C08K 5/34* | (2006.01) |
| *C08K 5/3477* | (2006.01) |
| *C08K 5/3492* | (2006.01) |
| *C08K 3/34* | (2006.01) |

(52) U.S. Cl.
USPC ............ 524/100; 524/101; 524/291; 524/492

(58) Field of Classification Search
USPC .................................. 524/100, 101, 291, 492
See application file for complete search history.

(56) References Cited

U.S. PATENT DOCUMENTS

| | | |
|---|---|---|
| 5,084,546 A | 1/1992 | Fischer et al. |
| 6,500,546 B1 | 12/2002 | Heine et al. |
| 6,756,430 B2 | 6/2004 | Matsuda et al. |
| 2004/0110878 A1 | 6/2004 | Knop et al. |
| 2004/0225040 A1 | 11/2004 | Hoerold |
| 2004/0227130 A1 | 11/2004 | Hoerold |
| 2004/0254270 A1 | 12/2004 | Harashina |
| 2005/0113496 A1 | 5/2005 | Saga |
| 2006/0058432 A1 | 3/2006 | Perego et al. |
| 2006/0167143 A1 | 7/2006 | Borade |
| 2006/0223921 A1 | 10/2006 | Bauer et al. |
| 2007/0072967 A1 | 3/2007 | Nass |
| 2007/0194289 A1 | 8/2007 | Anglin |
| 2009/0082494 A1 | 3/2009 | Kaprinidis |

FOREIGN PATENT DOCUMENTS

| | | |
|---|---|---|
| WO | 0002869 A1 | 1/2000 |
| WO | 2008/119693 A1 | 10/2008 |

*Primary Examiner* — Kriellion Sanders
(74) *Attorney, Agent, or Firm* — Tyler A. Stevenson

(57) ABSTRACT

The invention relates to flame retardant compositions that contain mixtures of melamine polyphosphates with layered silicates added to the polymer substrates, particularly polyamides.

9 Claims, No Drawings

LAYERED SILICATE FLAME RETARDANT COMPOSITIONS

This is a continuation of U.S. application Ser. No. 13/139,312, pending, which is a 371 of international app. No. PCT/EP2009/066715, filed Dec. 9, 2009, the contents of which are hereby incorporated by reference.

The present invention relates to flame retardant polymer compositions which comprise mixtures of melamine polyphosphates with layered silicates. The compositions are especially useful for the manufacture of flame retardant compositions based on thermoplastic polymers.

Flame retardants are added to polymeric materials (synthetic or natural) to enhance the flame retardant properties of the polymers. Depending on their composition, flame retardants may act in the solid, liquid or gas phase either chemically, e.g. as a spumescent by liberation of nitrogen, and/or physically, e.g. by producing a foam coverage. Flame retardants interfere during a particular stage of the combustion process, e.g. during heating, decomposition, ignition or flame spread.

The addition of fillers to organic materials, especially polymers, is known and is described for example in Hans Zweifel (editor), *Plastics Additives Handbook,* 5th Edition, pages 901-948, Hanser Publishers, München (Germany) 2001. The use of fillers in polymers has the advantage of improving, for example, the mechanical properties, especially the density, hardness, rigidity (modulus) or reduced shrinkage of the polymer.

Using extremely small filler particles (<200 nm), so-called nano-scaled fillers, mechanical properties, heat distortion temperature stability or flame retardant property of the polymers can be improved at a much lower concentration typically of 2 to 10% by weight compared to 20 to 50% by weight with the micro-scaled normal filler particles. Polymers containing nano-scaled fillers combine favourable mechanical properties like strength, modulus and impact, and show improved surface qualities like gloss, lower tool wear at processing and better conditions for recycling. Coatings and films comprising nano-scaled fillers show improved thermal stability, flame retardancy, gas barrier properties and scratch resistance.

Nano-scaled fillers possess an extremely large surface with high surface energy. The deactivation of the surface energy and the compatibilization of the nano-scaled fillers with a polymeric substrate is, therefore, even more important than with a common micro-scaled filler in order to avoid aggregation during processing or conversion of the filled polymer and to reach an excellent dispersion of the nano-scaled filler in the final article.

There is substantial recent literature on organic-inorganic nano-composites based on layered silicates such as montmorillonite and synthetic polymers. Polyolefin nano-composites have been prepared from organic modified clays. The clays used are generally modified with alkyl or dialkyl ammonium ions or amines or in a few cases other onium ions, like for example phosphonium. The ammonium ion/amine additives are usually incorporated into the clay structure by a separate solution or suspension intercalation step.

There is still a need for flame retardant compositions with improved properties that can be used in different polymer substrates. Increased standards with regard to safety and environmental requirements result in stricter regulations. Particularly known halogen containing flame retardants no longer match all necessary requirements. Therefore, halogen free flame retardants are preferred, particularly in view of lower toxicity and less environmental concerns and their better performance in terms of smoke density associated with fire. Improved thermal stability and less corrosive behaviour are further benefits of halogen free flame retardant compositions.

It has surprisingly been found that polymers with excellent flame retardant properties are prepared in the event that mixtures of melamine polyphosphates with layered silicates are added to the polymer substrate.

The invention relates to a composition, particularly a flame retardant composition, which comprises
a) At least one polyphosphate salt of a 1,3,5-triazine compound of the formula

Wherein T represents a 1,3,5-triazine compound; and
p represents a numeral greater than 3;
b) At least one natural or synthetic phyllosilicate or a mixture thereof; and
c) A polymer substrate; and
d) Phenolic antioxidants.

The composition defined above for use as a flame retardant is another embodiment of the invention.

A preferred embodiment of the invention relates to a composition, which comprises
a) At least one polyphosphate salt of a 1,3,5-triazine compound (I), wherein
p represents a numeral greater than 3;
and the 1,3,5-triazine content is higher than 1.0 mol 1,3,5-triazine compound per mol of phosphorus atom;
b) At least one layered silicate;
c) A thermoplastic polymer substrate; and
d) Phenolic antioxidants.

A particularly preferred embodiment of the invention relates to a composition, which comprises
a) At least one polyphosphate salt of a 1,3,5-triazine compound (I), wherein p represents a numeral greater than 10; and the 1,3,5-triazine content is higher than 1.1 mol 1,3,5-triazine compound per mol of phosphorus atom;
b) At least one unmodified layered silicate selected from the group consisting of montmorillonite, bentonite, beidelite, mica, hectorite, saponite, nontronite, sauconite, vermiculite, ledikite, magadite, kenyaite, stevensite, volkonskoite and hydrotalcite or mixtures thereof;
c) A thermoplastic polymer substrate; and
d) Phenolic antioxidants.

Another preferred embodiment of the invention relates to composition, which comprises
a) At least one polyphosphate salt of a 1,3,5-triazine compound (I), wherein p represents a numeral greater than 10; and the 1,3,5-triazine content is higher than 1.1 mol 1,3,5-triazine compound per mol of phosphorus atom;
b) At least one layered silicate selected from the group consisting of montmorillonite, bentonite, beidelite, mica, hectorite, saponite, nontronite, sauconite, vermiculite, ledikite, magadite, kenyaite, stevensite, volkonskoite, hydrotalcite, illite, kaolinite, wollastonite, attapulgite, talcum and silica or mixtures thereof modified by an ammonium, amine, a phosphonium, sulphonium or siloxane compound;
b) A thermoplastic polymer substrate; and
c) Phenolic antioxidants.

According to a highly preferred embodiment, the invention relates to a composition, which comprises a) At least one polyphosphate salt of a 1,3,5-triazine compound (I), wherein
   p represents a numeral greater than 10;
   and the 1,3,5-triazine content is higher than 1.1 mol 1,3,5-triazine compound per mol of phosphorus atom;

b) At least one unmodified layered silicate selected from the group consisting of montmorillonite, bentonite, beidelite, mica, hectorite, saponite, nontronite, sauconite, vermiculite, ledikite, magadite, kenyaite, stevensite, volkonskoite and hydrotalcite or mixtures thereof; and c) A thermoplastic polymer substrate selected from the group consisting of polyamides and copolyamides;

d) A phenolic antioxidant selected from the group consisting of octadecyl 3-(3,5-di-tert-butyl-4-hydroxyphenyl) propionate, pentaerythritol-tetrakis[3-(3,5-di-tert-butyl-4-hydroxyphenyl)propionate], tris(3,5-di-tert-butyl-4-hydroxyphenyl)isocyanurate, 1,3,5-trimethyl-2,4,6-tris(3,5-di-tert-butyl-4-hydroxybenzyl)benzene, triethylene-glycol-bis[3-(3-tert-butyl-4-hydroxy-5-methylphenyl)propionate], and N,N'-hexane-1,6-diyl-bis [3-(3,5-di-tert-butyl-4-hydroxyphenyl)propionamide].

The compositions according to the invention attain excellent ratings, according to UL-94 (Underwriter's Laboratories Subject 94), and other excellent ratings in related test methods where conventional flame retardants tend to fail and at the same time very good mechanical properties.

Compositions of flame retardants and polymers tend to increased melt viscosity as compared to the pure polymers due to interactions of chemical groups of the flame retardant with the polymer chain. This has the effect that the amide group of a polyamide may interact with a phosphate group of a flame retardant. However, an increased melt viscosity reduces the throughput and cycle time during processing and manufacturing of polymer articles, requires higher processing temperatures or higher energy cost. The present compositions of layered silicates and flame retardants, e.g. melamine derivatives, show a reduced influence on the melt viscosity and on the processing behaviour and, therefore, allow transforming processes close to the pure polymer.

Component a)

In a polyphosphate salt of a 1,3,5-triazine compound of the formula (I), the 1,3,5-triazine compound is the basic salt component which is selected from a variety of compounds within the scope of that definition, such as melamine, melam, melem, melon, ammeline, ammelide, 2-ureidomelamine, acetoguanamine, benzoguanamine or diamine phenyltriazine.

Melamine polyphosphate and a process for preparing this salt are described, inter alia, in WO 97/44377. According to this reference, melamine polyphosphate having a solubility of 0.01 to 0.10 g per 100 ml water at 25° C., a pH between 2.5 and 4.5, and a melamine/phosphorus molar ratio of between 1.0 and 1.1, may be obtained at 25° C. as aqueous slurry of 10.0 wt %.

The preparation of a polyphosphate salt of a 1,3,5-triazine compound wherein the number p of the average degree of condensation is between 5 and 200, and the 1,3,5-triazine content amounts to 1.1 to 2.0 mol of a 1,3,5-triazine compound is described in WO 00/02869.

This reference discloses a process which involves the conversion of a 1,3,5-triazine compound with orthophosphoric acid into its orthophosphate salt, followed by dehydration and thermal treatment to convert the orthophosphate salt into a polyphosphate of the 1,3,5-triazine compound.

The p-value of the polyphosphate salts is preferably above 10, particularly between 40 and 150, and the ratio of 1,3,5-triazine compound per mol of phosphorus atom is preferably between 1.2 and 1.8. Further, the pH of aqueous slurry of salts of 10.0 wt %, as prepared according to this method, is greater than 4.5 and preferably at least 5.0. The referenced pH value is determined by introducing the salt and pure water at room temperature into a 300-ml beaker, stirring the resulting aqueous slurry for some 30 minutes, and then measuring the pH.

This thermal treatment is preferably performed at a temperature of at least 300° C., and preferably at least 310° C. In addition to orthophosphates of 1,3,5-triazine compounds, other 1,3,5-triazine phosphates may also be used, including, for example, a mixture of orthophosphates and pyrophosphates.

The orthophosphate of the 1,3,5-triazine compound may be prepared in a variety of other processes. The preferred process involves adding the 1,3,5-triazine compound to an aqueous solution of orthophosphoric acid. An alternative process involves adding orthophosphoric acid to an aqueous slurry of the 1,3,5-triazine compound.

Some polyphosphate salts of a 1,3,5-triazine compound are commercially available, such as melamine polyphosphate (Melapur® 200, Ciba Inc, Basel Switzerland).

The above-mentioned polyphosphate salt is advantageously contained in the composition of the invention in an amount from about 0.1% to about 45.0% by weight of the organic polymer substrate; for instance about 1.0% to about 40.0%; for example about 5.0% to about 35.0% by weight of the polymer or based on the total weight of the composition.

Component b)

Component b) is filler in the size of nano-particles (nano-scaled filler or nano-particulate-filler). Preferred fillers are, for example, natural or synthetic phyllosilicates or mixtures of such phyllosilicates. Fillers of special interest are for example layered silicate. Of very special interest are compositions comprising as component b) at least one unmodified layered silicate selected from the group consisting of montmorillonite, bentonite, beidelite, mica, hectorite, saponite, nontronite, sauconite, vermiculite, ledikite, magadite, kenyaite, stevensite, volkonskoite, hydrotalcite, illite, kaolinite, wollastonite, attapulcite, talcum and silica or mixtures thereof.

Of specific interest are compositions comprising as component b) at least one unmodified layered silicate selected from the group consisting of montmorillonite, bentonite, beidelite, mica, hectorite, saponite, nontronite, sauconite, vermiculite, ledikite, magadite, kenyaite, stevensite, volkonskoite, hydrotalcite, illite, kaolinite, wollastonite, attapulgite, talcum and silica or a mixture thereof. According to an alternative embodiment, Component b) can be modified by a modification agent, such as, for example, an ammonium, an amine, and a phosphonium, sulphonium or siloxane compound. Examples of suitable modification agents for nanoclays are for example:

Amine and ammonium compounds, for example, distearyldimethylammonium chloride, stearylbenzyldimethylammonium chloride, stearylamine, stearyldiethoxyamine or aminododecanoic acid [e.g. Nanofil®, commercially available from Rockwood Additives Ltd., Germany]; dimethyl ditallow ammonium, trioctylmethyl ammonium, dipolyoxyethylenealkylmethyl ammonium or polyoxypropylenemethyldiethyl ammonium [modified Somasif®, commercially available from CO-OP Chemicals, Japan]; octadecylamine, triethoxysilanyl-propylamine [Nanomer®, commercially available from Nanocor, USA], polyalkoxylated ammonium compounds, such as, for example, octadecyl bis(polyoxyethylene[15]amine [Ethomeen®, commercially available from Eastman, USA] or octadecyl methyl bis (polyoxyethylene[15]ammonium chloride [Etoquad®, commercially available from Eastman, USA] or the corresponding free amines;

Phosphonium compounds for example tetrabutylphosphonium or octadecyl triphenyl phosphonium [commercially available from Eastman, USA];

Others, for example, triethoxyoctylsilane [Nanomer®, commercially available from Nanocor], ammonium, sulphonium or pyridinium compounds, as disclosed, for example, in WO-A-01/04050 or WO-A-99/67790; block or graft copolymers, such as, for example PEO-b-PS or poly-4-vinylpyridine-b-PS; or solvents for swelling, such as, for example, γ-butyrolactone, 2-pyrrolidone, dimethylsulphoxide, diglyme, tetrahydrofuran or furfuryl alcohol.

The above-mentioned phyllosilicate component is advantageously contained in the composition of the invention in an amount from about 0.1% to about 45.0% by weight of the organic polymer substrate; for instance about 1.0% to about 40.0%; for example about 5.0% to about 35.0% by weight of the polymer or based on the total weight of the composition.

Component c)

The term polymer substrate comprises within its scope thermoplastic polymers or thermosets, particularly polyamides or co-polyamides. A list of suitable synthetic polymers is given below:

1. Polyamides and co-polyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or co-polyamides modified with EPDM or ABS; and polyamides condensed during processing (RIM polyamide systems).

2. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different and especially by the following methods:

a) Radical polymerisation (normally under high pressure and at elevated temperature).

b) Catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, and amine or silyl ether groups. These catalyst systems are usually termed Phillips, Standard Oil Indiana, Ziegler-Natta), TNZ (DuPont), metallocene or single site catalysts (SSC).

3. Mixtures of the polymers mentioned under 2, for example mixtures of polypropylene with polyisobutylene, polypropylene with polyethylene (for example PP/HDPE, PP/LDPE) and mixtures of different types of polyethylene (for example LDPE/HDPE).

4. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

5. Hydrocarbon resins (for example $C_5$-$C_9$) including hydrogenated modifications thereof (e.g. tackifiers) and mixtures of polyalkylenes and starch;

The homopolymers and copolymers mentioned above may have a stereo structure including syndiotactic, isotactic, hemi-isotactic or atactic; where atactic polymers are preferred. Stereo block polymers are also included.

6. Polystyrene, poly(p-methylstyrene), poly(α-methylstyrene).

7. Aromatic homopolymers and copolymers derived from vinyl aromatic monomers including styrene, α-methylstyrene, all isomers of vinyl toluene, especially p-vinyl toluene, all isomers of ethyl styrene, propyl styrene, vinyl biphenyl, vinyl naphthalene, and vinyl anthracene, and mixtures thereof. Homopolymers and copolymers may have a stereo structure including syndiotactic, isotactic, hemi-isotactic or atactic; where atactic polymers are preferred. Stereo block polymers are also included;

a) Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

b) Hydrogenated aromatic polymers derived from hydrogenation of polymers mentioned under 7, especially including polycyclohexylethylene (PCHE) prepared by hydrogenating atactic polystyrene, often referred to as polyvinylcyclohexane (PVCH).

c) Hydrogenated aromatic polymers derived from hydrogenation of polymers mentioned under 7a. Homopolymers and copolymers may have a stereo structure including syndiotactic, isotactic, hemi-isotactic or atactic; where atactic polymers are preferred. Stereo block polymers are also included.

8. Graft copolymers of vinyl aromatic monomers such as styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 7, for example the copolymer mixtures known as ABS, MBS, ASA or AES polymers.

9. Halogen-containing polymers such as polychloroprene, chlorinated rubbers, chlorinated and brominated copolymer of isobutylene-isoprene (halobutyl rubber), chlorinated or sulphochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

10. Polymers derived from α,β-unsaturated acids and derivatives thereof such as polyacrylates and polymethacrylates; polymethyl methacrylates, polyacrylamides and polyacrylonitriles, impact-modified with butyl acrylate.

11. Copolymers of the monomers mentioned under 10 with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

12. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in Section 2 above.

13. Homopolymers and copolymers of cyclic ethers such as polyalkylene glycols, polyethylene oxide, polypropylene oxide or copolymers thereof with bisglycidyl ethers.

14. Polyacetals such as polyoxymethylene and those polyoxymethylenes, which contain ethylene oxide as a comonomer; polyacetals modified with thermoplastic polyurethanes, acrylates or MBS.

15. Polyphenylene oxides and sulphides, and mixtures of polyphenylene oxides with styrene polymers or polyamides.

16. Polyurethanes derived from hydroxy-terminated polyethers, polyesters or polybutadienes on the one hand and aliphatic or aromatic polyisocyanates on the other, as well as precursors thereof.

17. Polyureas, polyimides, polyamide imides, polyether imides, polyester imides, polyhydantoins and polybenzimidazoles.

18. Polyesters derived from dicarboxylic acids and diols and/or from hydroxycarboxylic acids or the corresponding lactones, for example poly-β-hydroxybutyric acid, poly-β-hydroxyvaleric, polylactides, particularly biodegradable polylactides or the corresponding copolymers from 1-lactic acid and ε-caprolactone, acid polyethylene terephthalate, polybutylene terephthalate, poly-1,4-dimethylolcyclohexane terephthalate, polyalkylene naphthalate (PAN) and polyhydroxybenzoates, as well as block co-polyether esters derived from hydroxy-terminated polyethers; and also polyesters modified with polycarbonates or MBS.

19. Polyketones.

20. Polysulphones, polyether sulphones and polyether ketones.

21. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

22. Polycarbonates that correspond to the general formula:

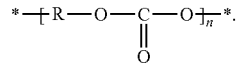

Such polycarbonates are obtainable by interfacial processes or by melt processes (catalytic transesterification). The polycarbonate may be either branched or linear in structure and may include any functional substituents. Polycarbonate copolymers and polycarbonate blends are also within the scope of the invention. The term polycarbonate should be interpreted as inclusive of copolymers and blends with other thermoplastics. Methods for the manufacture of polycarbonates are known, for example, from U.S. Pat. Nos. 3,030,331; 3,169,121; 4,130,458; 4,263,201; 4,286,083; 4,552,704;

5,210,268; and 5,606,007. A combination of two or more polycarbonates of different molecular weights may be used.

Component d)

The composition of the present invention contains at least one phenolic antioxidant selected from the group defined below:

Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example 2,6-di-nonyl-4-methylphenol, 2,4-dimethyl-6-(1'-methylundec-1'-yl)phenol, 2,4-dimethyl-6-(1'-methylheptadec-1'-yl) phenol, 2,4-dimethyl-6-(1'-methyltridec-1'-yl)phenol and mixtures thereof;

Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol;

Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl)adipate;

Tocopherols, for example α-, β-, γ-, δ-tocopherol and mixtures thereof (vitamin E);

Hydroxylated thiodiphenyl ethers, for example 2,2'-thiobis (6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)disulphide;

Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis [6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis-(5-tert-butyl-4-hydroxy-2-methylphenyl)-4-n-dodecylmercaptobutane, 1,1,5,5-tetra (5-tert-butyl-4-hydroxy-2-methylphenyl)pentane;

O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulphide, isooctyl-3,5-di-tert-butyl-4-hydroxybenzylmercaptoacetate;

Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, di-dodecylmercaptoethyl-2,2-bis(3,5-di-tert-butyl-4-hydroxybenzyl)malonate, bis[4-(1,1,3,3-tetramethylbutyl) phenyl]-2,2-bis(3,5-di-tert-butyl-4-hydroxybenzyl) malonate;

Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol;

Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1, 3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate;

Benzylphosphonates, for example dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid;

Acylaminophenols, for example 4-hydroxylauranilide, 4-hydroxystearanilide, octyl N-(3,5-di-tert-butyl-4-hydroxyphenyl)carbamate;

Esters of -(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, such as commercially available products like Irganox® 1076;

Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]undecane;

Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane;

Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(2-hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane;

Amides of β-(3,5-di-tert-butyl-4-hydroxyphenyl)propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1, supplied by Uniroyal);

Ascorbic acid (vitamin C).

Preferred specific phenolic antioxidants according to Component d) include octadecyl 3-(3,5-di-tert-butyl-4-hydroxyphenyl) propionate (IRGANOX 1076), pentaerythritol-tetrakis[3-(3,5-di-tert-butyl-4-hydroxyphenyl)propionate] (IRGANOX 1010), tris(3,5-di-tert-butyl-4-hydroxyphenyl) isocyanurate (IRGANOX 3114), 1,3,5-trimethyl-2,4,6-tris(3,5-di-tert-butyl-4-hydroxybenzyl)benzene (IRGANOX 1330), triethyleneglycol-bis[3-(3-tert-butyl-4-hydroxy-5-methylphenyl)propionate] (IRGANOX 245), and N,N'-hexane-1,6-diyl-bis[3-(3,5-di-tert-butyl-4-hydroxyphenyl)propionamide] (IRGANOX 1098).

The phenolic additives of Component d) mentioned above are preferably contained in an amount of 0.01 to 10.0%, especially 0.05 to 5.0%, relative to the weight of the polymer substrate according to Component c).

Additional Components

The instant invention further pertains to a composition, which comprises, in addition to the components a), b) and c), as defined above, as optional components further additives selected from the group consisting of so-called anti-dripping agents, polymer stabilizers and additional flame-retardants, such as phosphorus containing flame-retardants, nitrogen containing flame-retardants, halogenated flame-retardants and inorganic flame-retardants.

As mentioned above, the composition according to the invention may additionally contain one or more conventional additives, for example selected from pigments, dyes, plasticizers, antioxidants, thixotropic agents, levelling assistants, basic co-stabilizers, metal passivators, metal oxides, organophosphorus compounds, further light stabilizers and mixtures thereof, especially pigments, other antioxidants, calcium stearate, zinc stearate, UV absorbers of the 2-hydroxy-benzophenone, 2-(2'-hydroxyphenyl)benzotriazole and/or 2-(2-hydroxyphenyl)-1,3,5-triazine groups. More specific examples are the following components:

1. Light stabilisers:
    2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tertamyl-2'-hydroxyphenyl)benzotriazole, 2-(3',5'-bis(α,α-dimethylbenzyl)-2'-hydroxyphenyl)benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)-phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl) benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylenebis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$—]$_2$, where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)phenyl]benzotriazole; 2-[2'-hydroxy-3'-(1,1,3,3-tetramethylbutyl)-5'-(α,α-dimethylbenzyl)phenyl]benzotriazole, such as commercially available light stabilisers from the Tinuvin® series, such as TINUVIN 234, 326, 329, 350, 360 or TINUVIN 1577;

2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives;

Esters of substituted and unsubstituted benzoic acids, for example 4-tert-butylphenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate;

Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate and N-(β-carbomethoxy-(β-cyanovinyl)-2-methylindoline;

Nickel compounds, for example nickel complexes of 2,2'-thiobis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands;

Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides;

2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4- dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)-phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine;

2. Metal deactivators for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

3. Further phosphites and phosphonites, for example triphenyl phosphite, diphenylalkyl phosphites, phenyldialkyl phosphites, tris(nonylphenyl)phosphite, trilauryl phosphite, trioctadecyl phosphite, distearylpentaerythritol diphosphite, tris(2,4-di-tert-butylphenyl)phosphite, diisodecyl pentaerythritol diphosphite, bis(2,4-di-tert-butylphenyl)pentaerythritol diphosphite, bis(2,4-dicumylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosphocin, 2,2',2''-nitrilo[triethyltris(3,3'',5,5'-tetra-tert-butyl-1,1'-biphenyl-2,2'-diyl)phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

The following phosphites are especially preferred:
Tris(2,4-di-tert-butylphenyl) phosphite (Irgafos® 168, Ciba Inc.), tris(nonylphenyl) phosphite,

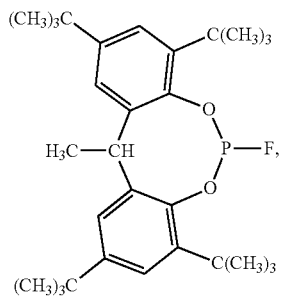
(A)

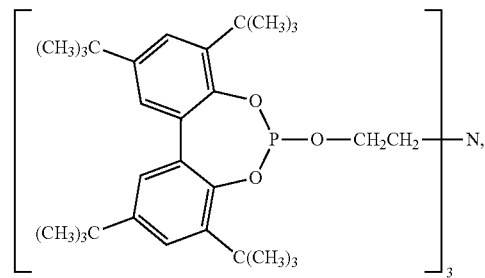
(B)

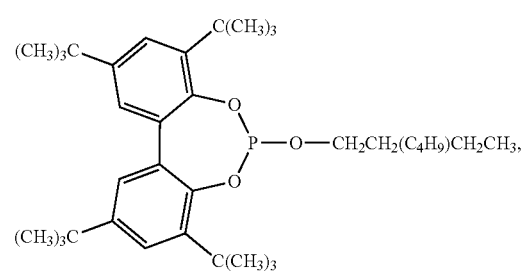
(C)

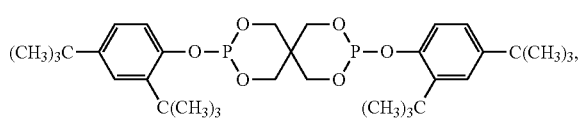
(D)

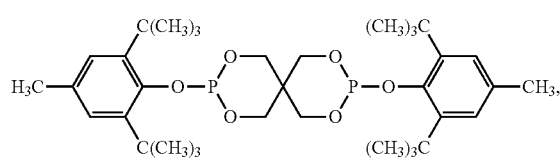
(E)

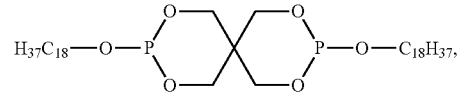
(F)

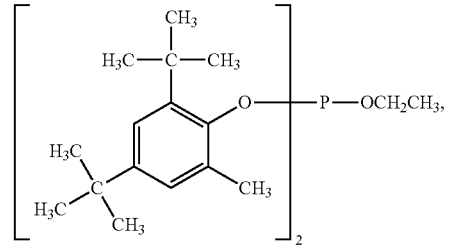
(G)

4. Further nitrones, for example N-benzyl-alpha-phenylnitrone, N-ethyl-alpha-methylnitrone, N-octyl-alpha-heptylnitrone, N-lauryl-alpha-undecylnitrone, N-tetradecyl-alpha-tridecylnitrone, N-hexadecyl-alpha-pentadecylnitrone, N-octadecyl-alpha-heptadecylnitrone, N-hexadecyl-alpha-heptadecylnitrone, N-ocatadecyl-alpha-pentadecylnitrone, N-heptadecyl-alpha-heptadecylnitrone, N-octadecyl-alpha-hexadecylnitrone, nitrone derived from N,N-dialkylhydroxyamine derived from hydrogenated tallow amine.

5. Thiosynergists, for example dilauryl thiodipropionate or distearyl thiodipropionate.

6. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulphide, pentaerythritol tetrakis(β-dodecylmercapto)propionate.

7. Polyamide stabilisers, for example copper salts in combination with iodides and/or phosphorus compounds and salts of divalent manganese.
8. Basic co-stabilisers for example melamine, polyvinylpyrrolidone, dicyandiamide, triallyl cyanurate, urea derivatives, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.
9. Nucleating agents, for example inorganic substances, such as talcum, metal oxides, such as titanium dioxide or magnesium oxide, phosphates, carbonates or sulphates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyldibenzylidene)sorbitol, and 1,3:2,4-di(benzylidene)sorbitol.
10. Further fillers and reinforcing agents, for example calcium carbonate, silicates, glass fibres, glass bulbs, stainless steel fibres, aramide fibers, asbestos, talc, kaolin, mica, barium sulphate, metal oxides and hydroxides, carbon black, graphite, wood flour and flours or fibers of other natural products, synthetic fibres.
11. Other additives, for example blend compatibilizing agents, plasticisers, lubricants, emulsifiers, pigments, rheology additives, catalysts, flow-control agents, optical brighteners, flame proofing agents, antistatic agents and blowing agents.
12. Additional benzofuranones and indolinones, for example those disclosed in U.S. Pat. No. 4,325,863; 4,338,244; 5,175,312; 5,216,052; or 5,252,643; DE-A-4316611; DE-A-4316622; DE-A-4316876; EP-A-0589839 or EP-A-0591102 or 3-[4-(2-acetoxyethoxy)phenyl]-5,7-di-tert-butylbenzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one.

According to a preferred embodiment the invention relates to a composition, which additionally comprises further additives selected from the group consisting of polymer stabilizers and additional flame retardants.

According to another embodiment, the invention relates to a composition which additionally comprises as additional component so-called anti-dripping agents.

These anti-dripping agents reduce the melt flow of the thermoplastic polymer and inhibit the formation of drops at high temperatures. Various references, such as U.S. Pat. No. 4,263,201, describe the addition of anti-dripping agents to flame retardant compositions.

Suitable additives that inhibit the formation of drops at high temperatures include glass fibers, polytetrafluoroethylene (PTFE), high temperature elastomers, carbon fibers, glass spheres and the like.

The addition of polysiloxanes of different structures has been proposed in various references; cf. U.S. Pat. No. 6,660,787, 6,727,302 or 6,730,720.

According to a preferred embodiment of the invention, the composition comprises an additional flame retardant component. Such additional flame-retardants are known components, items of commerce or can be obtained by known methods. Halogen-free flame retardants are preferred.

According to a preferred embodiment, the composition comprises as an additional flame retardant component the metal salt of hypophosphinic acid, as represented by the formula

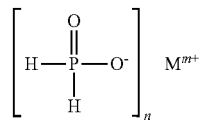

in which
M represents $(C_1$-$C_4alkyl)_4N$, $(C_1$-$C_4alkyl)_3NH$, $(C_2$-$C_4alkylOH)_4N$, $(C_2$-$C_4alkylOH)_3NH$, $(C_2$-$C_4alkylOH)_2N(CH_3)_2$, $(C_2$-$C_4alkylOH)_2NHCH_3$, $(C_6H_5)_4N$, $(C_6H_5)_3NH$, $(C_6H_5CH_3)_4N$, $(C_6H_5CH_3)_3NH$, $NH_4$, an alkali metal or earth alkali metal ion, or an aluminium, zinc, iron or boron ion;
m is a numeral from 1-3 and indicates the number of positive charges on M; and
n is a numeral from 1-3 and indicates the number of phosphinic acid anions corresponding to $M^{m+}$.

A highly preferred embodiment relates to a composition, which comprises as additional flame retardant component the aluminium salt of hypophosphinic acid.

Other representative phosphorus containing flame-retardants, in addition to the ones defined above with regard to components a) and b), are for example:

Tetraphenyl resorcinol diphosphite (Fyrolflex® RDP, Akzo Nobel), resorcinol diphosphate oligomer (RDP), tetrakis(hydroxymethyl)phosphonium sulphide, triphenyl phosphate, diethyl-N,N-bis(2-hydroxyethyl)-aminomethyl phosphonate, hydroxyalkyl esters of phosphorus acids, salts of hypophosphoric acid $(H_3PO_2)$ with suitable cations, such as $Ca^{2+}$, $Zn^{2+}$ or $Al^{3+}$, ammonium polyphosphate (APP) or (Hostaflam® AP750), resorcinol diphosphate oligomer (RDP), phosphazene flame-retardants and ethylenediamine diphosphate (EDAP).

Nitrogen containing flame-retardants are, for example, isocyanurate flame-retardants, such as polyisocyanurate, esters of isocyanuric acid or isocyanurates. Representative examples are hydroxyalkyl isocyanurates, such as tris-(2-hydroxyethyl)isocyanurate, tris(hydroxymethyl)isocyanurate, tris(3-hydroxy-n-proyl)isocyanurate or triglycidyl isocyanurate.

Nitrogen containing flame-retardants include further melamine-based flame-retardants. Representative examples are: melamine cyanurate, melamine borate, melamine phosphate, melamine pyrophosphate, melamine ammonium polyphosphate, melamine ammonium pyrophosphate or dimelamine phosphate.

Further examples are: benzoguanamine, tris(hydroxyethyl) isocyanurate, allantoin, glycoluril, dimelamine phosphate, urea cyanurate, ammonium polyphosphate, a condensation product of melamine from the series melem, melam, melon and/or a higher condensed compound or a reaction product of melamine with phosphoric acid or a mixture thereof.

Suitable inorganic flame retardants include, for example, aluminum trihydroxide (ATH), boehmite (AlOOH), magnesium dihydroxide (MDH), zinc borates, $CACO_3$ or layered double hydroxides, optionally modified with organic substituents.

Some organohalogen flame-retardants are, for example:
Polybrominated diphenyl oxide (DE-60F, Great Lakes Corp.), decabromodiphenyl oxide (DBDPO; Saytex® 102E), tris[3-bromo-2,2-bis(bromomethyl)propyl]phosphate (PB 370®, FMC Corp.), tris(2,3-dibromopropyl)phosphate, tris (2,3-dichloropropyl)phosphate, chlorendic acid, tetrachlorophthalic acid, tetrabromophthalic acid, poly-β-chloroethyl triphosphonate mixture, tetrabromobisphenol A bis(2,3-dibromopropyl ether) (PE68), brominated epoxy resin, ethylene-bis(tetrabromophthalimide) (Saytex® BT-93), bis (hexachlorocyclopentadieno)cyclooctane (Declorane Plus®), chlorinated paraffins, octabromodiphenyl ether, hexachlorocyclopentadiene derivatives, 1,2-bis(tribromophenoxy)ethane (FF680), tetrabromo-bisphenol A (Saytex® RB100), ethylene bis-(dibromo-norbornanedicarboximide) (Saytex® BN-451), bis-(hexachlorocycloentadeno) cyclooctane, PTFE, tris-(2,3-dibromopropyl)-isocyanurate, and ethylene-bis-tetrabromophthalimide.

The flame-retardant mentioned above routinely combined with an inorganic oxide synergist. Most common for this use are zinc or antimony oxides, e.g. $Sb_2O_3$ or $Sb_2O_5$. Boron compounds are suitable, too.

The above-mentioned additional flame-retardant classes are advantageously contained in the composition of the invention in an amount from about 0.5% to about 25.0% by weight of the organic polymer substrate; for instance about 1.0% to about 20.0%; for example about 5.0% to about 15.0% by weight of the polymer Component c) or based on the total weight of the composition.

As mentioned above, the composition according to the invention may additionally contain one or more conventional additives, for example selected from polymeric dispersing agents, pigments, dyes, plasticizers, antioxidants, thixotropic agents, levelling assistants, basic co-stabilizers, metal passivators, metal oxides, organophosphorus compounds, further light stabilizers and mixtures thereof, especially pigments, phenolic antioxidants, calcium stearate, zinc stearate, UV absorbers of the 2-hydroxybenzophenone, 2-(2'-hydroxyphenyl)benzotriazole and/or 2-(2-hydroxyphenyl)-1,3,5-triazine groups.

A suitable polymeric dispersing agent consists of a polymeric chain and at least one so-called anchoring group. The polymeric chain provides solubility properties within the polymer substrate as well as steric stabilization and determines the compatibility with the polymer system, whereas the anchoring group is connected with the flame retardant molecule itself.

Suitable polymeric dispersing agents are characterized by their effect of wetting solid flame retardant molecules, prevent viscosity build-up by dispersed flame retardant particles and prevent such particles from reflocculation.

Suitable polymeric dispersing agents are commercially available items e.g. under the product name SMA® Resins (Sartomer Corp.), such as the styrene-maleic acid anhydride copolymers which correspond to the general formula:

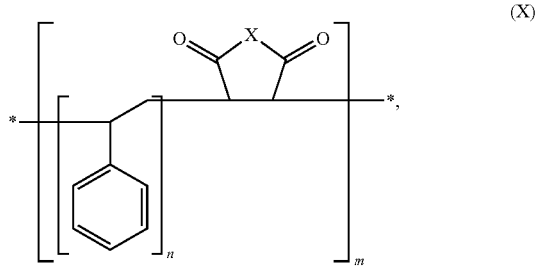

(X)

wherein —X— represents —O—, —NH— or —NR—, wherein R represents $C_1$-$C_4$alkyl or aryl, particularly phenyl, m is a numeral from 1-50 and n is a numeral from 1-5, particularly the product SMA® 1000P. This product is a low molecular weight styrene, maleic anhydride copolymer with an approximately 1:1 mol ratio.

Other suitable products are so-called styrene maleic anhydride copolymers, particularly the products SMA 1000F, 17352P, 2000F, 2000P, 2625F, 2625P, 3000F, 3000P, 3840F, 17352F, 1440, 17352H, 1000H, 2625H, 1440H, 1000H or 3000H or so-called styrene maleimide resins, particularly the products SMA 3000I, 4000I or 2000I.

According to an alternative embodiment, suitable polymeric dispersing agents are commercially available items under the product designation Ciba®EFKA® "Processing aids and surface modifiers for polymer systems", with a suitable molecular weight range is from 4 000-20 000.

A suitable product is an aliphatic polyether substituted by acidic groups, as represented by the formula

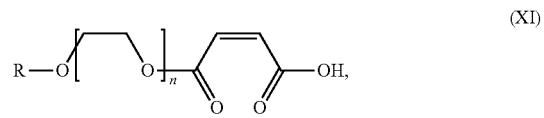

(XI)

Wherein R represents a $C_8$-$C_{18}$alkyl group and n represents a numeral from 5 to 10, such as the product EFKA®8530 (aliphatic polyether with acidic groups). Other suitable products are EFKA®5054 (High molecular weight carboxylic acid salt)
EFKA®8462 (Modified polyacrylate)
EFKA®8530 (Aliphatic polyether with acidic groups)
EFKA®8531 (Modified polyester)
EFKA®8532 (Acidic polyether)
EFKA®8533 (Modified polyether)
EFKA®8534 (Partial amide and salt of high-molecular weight unsaturated carboxylic acid)
EFKA®8536 (Polycarbonic acid-adduct, anionic).

The amount of dispersing agents present in the composition is not critical and may vary within broad ranges. According to a preferred embodiment, the amount of dispersing agents present in the composition is within a concentration range of 0.05-10.0 wt.-%, particularly 0.5-5.0 wt.-%.

According to a preferred embodiment, the additional additives for the compositions as defined above are selected from the group consisting of processing stabilizers, such as the above-mentioned phosphites, the above-mentioned phenolic antioxidants according to Component d), and light stabilizers, such as benzotriazoles. Specific processing stabilizers include tris(2,4-di-tert-butylphenyl) phosphite (IRGAFOS 168), 3,9-bis(2,4-di-tert-butylphenoxy)-2,4,8,10-tetraoxa-3,9-diphosphaspiro[5.5]undecane (IRGAFOS 126), 2,2',2"-nitrilo[triethyl-tris(3,3',5,5'-tetra-tert-butyl-1,1'-biphenyl-2,2'-diyl)]phosphite (IRGAFOS 12), and tetrakis(2,4-di-tert-butylphenyl)[1,1-biphenyl]-4,4'-diylbisphosphonite (IRGAFOS P-EPQ).

Specific light stabilizers include 2-(2H-benzotriazole-2-yl)-4,6-bis(1-methyl-1-phenylethyl)-phenol (TINUVIN 234), 2-(5-chloro(2H)-benzotriazole-2-yl)-4-(methyl)-6-(tert-butyl)phenol (TINUVIN 326), 2-(2H-benzotriazole-2-yl)-4-(1,1,3,3-tetramethylbutyl)phenol (TINUVIN 329), 2-(2H-benzotriazole-2-yl)-4-(tert-butyl)-6-(sec-butyl)phenol (TINUVIN 350), 2,2'-methylenebis(6-(2H-benzotriazol-2-yl)-4-(1,1,3,3-tetramethylbutyl)phenol) (TINUVIN 360), and 2-(4,6-diphenyl-1,3,5-triazin-2-yl)-5-[(hexyl)oxy]-phenol (TINUVIN 1577), 2-(2'-hydroxy-5'-methylphenyl)benzotriazole (TINUVIN P), 2-hydroxy-4-(octyloxy)benzophenone (CHIMASSORB 81), 1,3-bis-[(2'-cyano-3',3'- diphenylacryloyl)oxy]-2,2-bis-{[(2'-cyano-3',3'-diphenylacryloyl)oxy]methyl}-propane (UVINUL 3030, BASF), ethyl-2-cyano-3,3-diphenylacrylate (UVINUL 3035, BASF), and (2-ethylhexyl)-2-cyano-3,3-diphenylacrylate (UVINUL 3039, BASF).

Process

The incorporation of the components defined above into the polymer component is carried out by known methods, such as dry blending in the form of a powder, or wet mixing in the form of solutions, dispersions or suspensions for example in an inert solvent, water or oil. The additive components a), b) and d) and optional further additives may be incorporated, for example, before or after molding or also by applying the dissolved or dispersed additive or additive mixture to the polymer material, with or without subsequent evaporation of the solvent or the suspension/dispersion agent. They may be added directly into the processing apparatus, e.g. extruders, internal mixers, etc., as a dry mixture or powder, or as a solution or dispersion or suspension or melt.

The addition of the additive components to the polymer substrate c) can be carried out in customary mixing machines in which the polymer is melted and mixed with the additives. Suitable machines are known to those skilled in the art. They are predominantly mixers, kneaders and extruders.

The process is preferably carried out in an extruder by introducing the additive during processing. Particularly preferred processing machines are single-screw extruders, contra-rotating and co-rotating twin-screw extruders, planetary-gear extruders, ring extruders or co-kneaders. It is also possible to use processing machines provided with at least one gas removal compartment to which a vacuum can be applied.

Suitable extruders and kneaders are described, for example, in *Handbuch der Kunststoffextrusion, Vol.* 1 Grundlagen, Editors F. Hensen, W. Knappe, H. Potente, 1989, pp. 3-7, ISBN:3-446-14339-4 (*Vol. 2 Extrusionsanlagen* 1986, ISBN 3-446-14329-7).

For example, the screw length is 1-60 screw diameters, preferably 35-48 screw diameters. The rotational speed of the screw is preferably 10-600 rotations per minute (rpm), preferably 25-300 rpm.

The maximum throughput is dependent on the screw diameter, the rotational speed and the driving force. The process of the present invention can also be carried out at a level lower than maximum throughput by varying the parameters mentioned or employing weighing machines delivering dosage amounts.

If a plurality of components is added, these can be premixed or added individually.

The additive components a), b) and d) and optional further additives can also be sprayed onto the polymer substrate c). The additive mixture dilutes other additives, for example the conventional additives indicated above, or their melts so that they can be sprayed also together with these additives onto the polymer substrate. Addition by spraying during the deactivation of the polymerisation catalysts is particularly advantageous; in this case, the steam evolved may be used for deactivation of the catalyst. In the case of spherically polymerised polyolefins it may, for example, be advantageous to apply the additives of the invention, optionally together with other additives, by spraying.

The additive components a), b) and d) and optional further additives can also be added to the polymer in the form of a master batch ('concentrate") which contains the components in a concentration of, for example, about 10.0% to about 60.0% and preferably 5.0% to about 40.0% by weight incorporated in a polymer. The polymer is not necessarily of identical structure than the polymer where the additives are added finally. In such operations, the polymer can be used in the form of powder, granules, solutions, and suspensions or in the form of lattices.

Incorporation can take place prior to or during the shaping operation. The materials containing the additives of the invention described herein preferably are used for the production of molded articles, for example roto-molded articles, injection molded articles, profiles and the like, and especially a fiber, spun melt non-woven, film or foam.

FURTHER EMBODIMENTS

A further embodiment of the invention relates to an additive mixture, which comprises
a) At least one polyphosphate salt of a 1,3,5-triazine compound of the formula (I),
Wherein T represents a 1,3,5-triazine compound; and
p represents a numeral greater than 3; and
b) At least one natural or synthetic phyllosilicate or a mixture thereof; and
d) Phenolic antioxidants.

The components a), b) and d) are admixed to the polymer substrate c) in concentrations of 0.05-30.0 wt. %, preferably 0.1-20.0 wt. % for component a), 0.5-40.0 wt. %, preferably 1.0-25 wt. % for component b), and 0.01-10.0 wt. %, preferably 0.05-5.0 wt. % for Component d).

The preferred weight ratio of components a):b):c) is in the range 40:1:1-1:2:1, preferably 20:1:1-1:1:1.

According to a preferred embodiment, the weight ratio of the polyphosphate component a) to the phyllosilicate component b) is between about 2:1 to 20:1. 100 parts of the polymer substrate c) contain about 1-40 parts of the additive mixture defined above.

A further embodiment of the invention relates to process for imparting flame retardancy to a polymer substrate, which process comprises adding to a polymer substrate the mixture defined above.

A preferred embodiment of the invention relates to process for imparting flame retardancy to a thermoplastic polymer substrate selected from the group consisting of polyamides and copolyamides, which process comprises adding to a polymer substrate the additive mixture defined above.

The following Examples illustrate the invention:

EXAMPLES

Components

Polyamide 6 (PA 6): Zytel®7301 NC010, Dupont de Nemours International Genève Suisse;

Natural montmorillonite clay modified with stearylbenzyldimethylammonium chloride ("modified clay"): Nanofil®, Rockwood Additives Ltd., Moosburg, Germany;

Melamine polyphosphate: Melapur 200®, Ciba;

Antioxidant blend of tris-(2,4-di-tert-butylphenyl)phosphite and N,N'-hexane-1,6-diyl-bis[3-(3,5-di-tert-butyl-4-hydroxyphenyl)-propionamide]: Ciba®Irganox® B1171.

Test Methods to Assess Flame Retardancy

The UL 94 test is performed according to the general rules described in "*Flammability of Plastic Materials for Parts in Devices and Appliances*", 5th edition, Oct. 29, 1996. The ratings according to the UL 94 V test are compiled in the following table (times are indicated for one specimen):

| Rating | After-flame Time | Burning Drips |
|---|---|---|
| V-0 | <10 s | No |
| V-1 | <30 s | No |
| V-2 | <30 s | Yes |
| n.c.(=not classified) | >30 s | |

Standard Procedure/Examples

The samples are prepared by mechanically mixing dried PA 6 (80° C., 18 h and vacuum) with the antioxidant blend (0.25%) and different concentrations of the organoclay and flame retardant. Melt compound is carried out in a single-screw laboratory extruder (Brabender PLE 330 plasticorder, diameter: 20, UD:25). The temperature settings from hopper to die are 220°, 230°, 240° and 250° C. The screw rotation speed is maintained at 20 rpm. The standard test specimen are obtained from an Arburg 320 S-800-150 injection molding machine (Lossburg, Germany). The barrel zone temperatures are set in the range of 250°-265° C. The mold temperature is kept at 80° C. and the injection pressure is 80 bar.

Unless stated otherwise, all experiments of each series are carried out under identical conditions to ensure comparability (e.g. temperature profiles, screw geometries, addition of flame retardant additives, injection-molding parameters, etc.). All amounts are listed by their weight amounts and are based on the plastic molding composition including the flame retardant(s) and further additives. The burning times are given as sum of burning times for 5 specimen.

TABLE 1

| Example No. | Composition | Total Burning Time [sec] | UL-94 Classification |
|---|---|---|---|
| 1 (Referential) | PA-6 | 666 | n.c. |
| 2 (Referential) | PA-6 + 1.0% Modified Clay | 479 | n.c. |
| 3 (Referential) | PA-6 + 5.0% Modified Clay | 437 | n.c. |
| 4 (Referential) | PA-6 + 7.5% MELAPUR 200 | 138 | n.c. |
| 5 (Referential) | PA-6 + 12.5% MELAPUR 200 | 153 | n.c. |
| 6 | PA-6 + 6.5% MELAPUR 200 + 1.0% Modified Clay | 53 | V-2 |
| 7 | PA-6 + 9.0% MELAPUR 200 + 1.0% Modified Clay | 41 | V-2 |

In another series of experiments samples are prepared by mechanically mixing dried PA 6 (80° C., 18 h, vacuum) with the antioxidant blend (0.25%) and different concentrations of the organoclay (Nanofil 9) and flame retardant. Melt compounding is performed on a twin screw extruder Haake Rheomex PTW 16, L/D=25 (240-235-235-235-235-230 barrel/die temperatures and 150 rpm, experiment 13-14 at 200 rpm). Standard test samples are obtained from an Arburg 320 S-800-150 injection molding machine as described in Examples 1-7. In addition to the flame tests mechanical properties (tensile strength, elongation at break, tensile modulus) are measured according to ISO 527.

TABLE 2

| Example No. | Composition | Total Burning Time [sec] | UL-94 Classification | Tensile Strength [MPa] | Elongation at Break [%] | Tensile Modulus [MPa] |
|---|---|---|---|---|---|---|
| 8 (Referential) | PA-6 | n.d. | n.c. | 71.4 | 23.2 | 2726 |
| 9 (Referential) | PA-6 + 1.0% modified clay | 237 | n.c. | 69.4 | 2.8 | 3027 |
| 10 | PA-6 + 1.0% modified clay + 4.0% MELAPUR 200 | 38 | V-2 | 81.9 | 8.0 | 3426 |
| 11 | PA-6 + 0.5% modified clay + 6.0% MELAPUR 200 | 55 | V-2 | 80.7 | 7.5 | 3421 |
| 12 | PA-6 + 1.0% modified clay + 6.0% MELAPUR 200 | 36 | V-2 | 73.7 | 2.1 | 3476 |
| 13 | PA-6 + 20.0% MELAPUR 200 | 25 | V-2 | 51.5 | 1.6 | 3498 |
| 14 | PA-6 + 1.0% modified clay + 20.0% MELAPUR 200 | 69 | V-2 | 79.5 | 2.4 | 3873 |

The inventive compositions 10-14 show improved mechanical properties (high modulus and tensile strength) at good flame retardancy.

The invention claimed is:

1. A composition, which comprises
   a) at least one polyphosphate salt of a 1,3,5-triazine compound of formula (I)

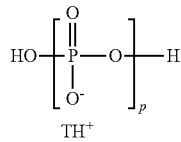

wherein T represents a 1,3,5-triazine compound and p represents a numeral greater than 3;
   b) at least one layered silicate selected from the group consisting of montmorillonite, bentonite, beidelite, mica, hectorite, saponite, nontronite, sauconite, vermiculite, ledikite, magadite, kenyaite, stevensite, volkonskoite and mixtures thereof; where the layered silicate is modified by a modification agent selected from the group consisting of an ammonium, amine, a phosphonium, sulphonium and a siloxane compound;
   c) a polymer substrate and
   d) phenolic antioxidants.

2. A composition according to claim 1, which comprises
   a) at least one polyphosphate salt of a 1,3,5-triazine compound (I), wherein
   p represents a numeral greater than 3 and the 1,3,5-triazine content is higher than 1.0 mol 1,3,5-triazine compound per mol of phosphorus atom;
   b) at least one modified layered silicate selected from the group consisting of montmorillonite, bentonite, beidelite, mica, hectorite, saponite, nontronite, sauconite, vermiculite, ledikite, magadite, kenyaite, stevensite, volkonskoite and mixtures thereof;
   c) a thermoplastic polymer substrate and
   d) phenolic antioxidants.

3. A composition according to claim 1, which comprises
   a) at least one polyphosphate salt of a 1,3,5-triazine compound (I), wherein
   p represents a numeral greater than 10 and the 1,3,5-triazine content is higher than 1.1 mol 1,3,5-triazine compound per mol of phosphorus atom;
   b) at least one modified layered silicate selected from the group consisting of montmorillonite, bentonite, beidelite, mica, hectorite, saponite, nontronite, sauconite, vermiculite, ledikite, magadite, kenyaite, stevensite, volkonskoite and mixtures thereof;
   c) a thermoplastic polymer substrate and
   d) phenolic antioxidants.

4. A composition according to claim 1, which comprises
   a) at least one polyphosphate salt of a 1,3,5-triazine compound (I), wherein
   p represents a numeral greater than 10 and the 1,3,5-triazine content is higher than 1.1 mol 1,3,5-triazine compound per mol of phosphorus atom;
   b) at least one modified layered silicate selected from the group consisting of montmorillonite, bentonite, beidelite, mica, hectorite, saponite, nontronite, sauconite, vermiculite, ledikite, magadite, kenyaite, stevensite, volkonskoite and mixtures thereof; wherein the layered silicate is modified by an ammonium compound;
   c) a thermoplastic polymer substrate selected from the group consisting of polyamides and copolyamides and
   d) phenolic antioxidants.

5. A composition according to claim 1, which comprises
   a) at least one polyphosphate salt of a 1,3,5-triazine compound (I), wherein
   p represents a numeral greater than 10 and the 1,3,5-triazine content is higher than 1.1 mol 1,3,5-triazine compound per mol of phosphorus atom;
   b) at least one modified layered silicate selected from the group consisting of montmorillonite, bentonite, beidelite, mica, hectorite, saponite, nontronite, sauconite, vermiculite, ledikite, magadite, kenyaite, stevensite, volkonskoite and mixtures thereof; where the layered silicate is modified by an ammonium compound;
   c) a thermoplastic polymer substrate selected from the group consisting of polyamides and copolyamides; and
   d) a phenolic antioxidant selected from the group consisting of octadecyl 3-(3,5-di-tert-butyl-4-hydroxyphenyl)propionate, pentaerythritol-tetrakis[3-(3,5-di-tert-butyl-4-hydroxyphenyl)propionate], tris(3,5-di-tert-butyl-4-hydroxyphenyl)isocyanurate, 1,3,5-trimethyl-2,4,6-tris(3,5-di-tert-butyl-4-hydroxybenzyl)benzene, triethyleneglycol-bis[3-(3-tert-butyl-4-hydroxy-5-methylphenyl)propionate] and N,N'-hexane-1,6-diyl-bis[3-(3,5-di-tert-butyl-4-hydroxyphenyl)propionamide].

6. A composition according to claim 1, wherein the weight ratio of components a):b):d) is in the range from 40:1:1-1:2:1.

7. A composition according to claim 1, wherein the weight ratio of components a):b):d) is in the range from 20:1:1-1:1:1.

8. A composition according to claim 1, which comprises
   a) melamine polyphosphate
   b) at least one modified layered silicate selected from the group consisting of montmorillonite, bentonite, beidelite, mica, hectorite, saponite, nontronite, sauconite, vermiculite, ledikite, magadite, kenyaite, stevensite, volkonskoite and mixtures thereof; where the layered silicate is modified by an ammonium compound;
   c) a thermoplastic polymer substrate selected from the group consisting of polyamides and copolyamides; and
   d) a phenolic antioxidant selected from the group consisting of octadecyl 3-(3,5-di-tert-butyl-4-hydroxyphenyl)propionate, pentaerythritol-tetrakis[3-(3,5-di-tert-butyl-4-hydroxyphenyl)propionate], tris(3,5-di-tert-butyl-4-hydroxyphenyl)isocyanurate, 1,3,5-trimethyl-2,4,6-tris(3,5-di-tert-butyl-4-hydroxybenzyl)benzene, triethyleneglycol-bis[3-(3-tert-butyl-4-hydroxy-5-methylphenyl)propionate] and N,N'-hexane-1,6-diyl-bis[3-(3,5-di-tert-butyl-4-hydroxyphenyl)propionamide].

9. A composition according to claim 1, which comprises
   a) melamine polyphosphate,
   b) at least one layered montmorillonite modified with an ammonium compound,
   c) a thermoplastic polymer substrate selected from the group consisting of polyamides and copolyamides and
   d) a phenolic antioxidant selected from the group consisting of octadecyl 3-(3,5-di-tert-butyl-4-hydroxyphenyl)propionate, pentaerythritol-tetrakis[3-(3,5-di-tert-butyl-4-hydroxyphenyl)propionate], tris(3,5-di-tert-butyl-4-hydroxyphenyl)isocyanurate, 1,3,5-trimethyl-2,4,6-tris(3,5-di-tert-butyl-4-hydroxybenzyl)benzene, triethyleneglycol-bis[3-(3-tert-butyl-4-hydroxy-5-methylphenyl)propionate] and N,N'-hexane-1,6-diyl-bis[3-(3,5-di-tert-butyl-4-hydroxyphenyl)propionamide].

* * * * *